Figures 1, 2:
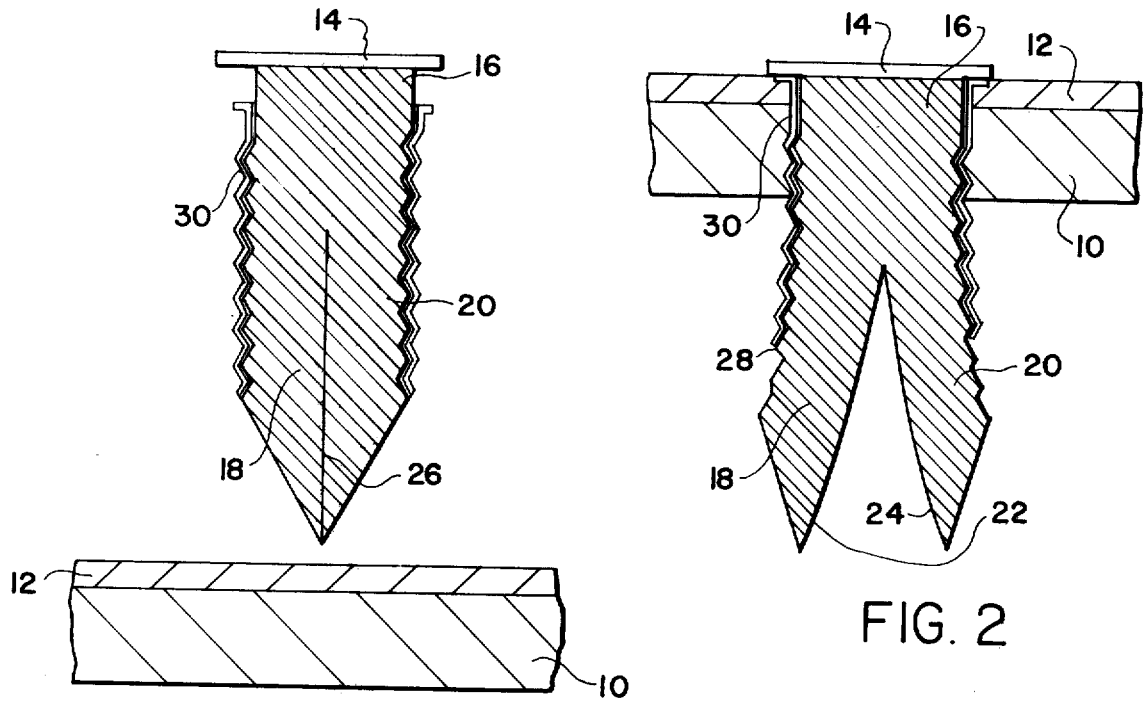

United States Patent [19]

Forcina

[11] 4,179,975
[45] Dec. 25, 1979

[54] ANCHORING NAIL

[76] Inventor: John Forcina, 7209 Myrtle Ave., Glendale, N.Y. 11227

[21] Appl. No.: 893,192

[22] Filed: Apr. 3, 1978

Related U.S. Application Data

[63] Continuation of Ser. No. 765,925, Feb. 7, 1977, abandoned.

[51] Int. Cl.² .............................................. F16B 15/04
[52] U.S. Cl. .......................................... 85/23; 85/21; 85/31; 85/80
[58] Field of Search ...................... 85/23, 31, 26, 10 R, 85/49, 80, 81, 87, 68, 83, 84, 8.3, 8.1, 5 R, 21, 22, 30, 38, 63, 13; 24/211 R, 208 A

[56] References Cited
U.S. PATENT DOCUMENTS

| | | | |
|---|---|---|---|
| 872,180 | 11/1907 | Hite | 85/8.3 |
| 1,855,329 | 4/1932 | Wagner | 85/23 X |
| 2,878,709 | 3/1959 | Horvath | 85/87 X |
| 3,216,414 | 11/1965 | Street | 85/13 X |
| 3,333,499 | 8/1967 | Rudd | 85/26 X |
| 3,645,163 | 2/1972 | Byland | 85/21 X |
| 3,919,916 | 11/1975 | Alexander | 85/23 X |

FOREIGN PATENT DOCUMENTS 1392031  4/1975  United Kingdom ............. 85/26

*Primary Examiner*—Rodney H. Bonck
*Attorney, Agent, or Firm*—Robert D. Farkas

[57] ABSTRACT

A self anchoring nail that is characterized by a spring-stat nail shaft having a longitudinal split therein and a collar therearound that prevents premature expansion of the nail shaft into two sides.

9 Claims, 2 Drawing Figures

ANCHORING NAIL

This application is a continuation of prior U.S. application Ser. No. 765,925 filed on Feb. 7, 1977 and now abandoned.

BACKGROUND OF THE INVENTION

This invention relates to a nail; more particularly, to a self anchoring nail that is longitudinally bifurcated for expansion behind the wall surface.

The prior teaches a variety of anchoring nails, for example, as disclosed in U.S. Pat. Nos. 1,006,468; 1,095,052; 2,150,788; 2,601,803; 2,745,308; 3,333,499; and others.

SUMMARY OF THE INVENTION

It is accordingly an object of the instant invention to provide for a new and improved self anchoring nail.

It is another object to provide for one having the attributes as aforedescribed.

It is a further object to provide for the same at relatively little cost thereby making it generally available.

These and other objects and advantages of the invention will become more apparent from a consideration of the following detailed disclosure and claims and by reference to the accompanying drawings, in which:

FIG. 1 is a perspective view showing the invention prior to insertion into a wall; and FIG. 2 is similar to FIG. 1 but after insertion into the wall.

Broadly speaking, the instant invention includes the provision of a self anchoring nail, comprising a head portion and a spring steel shank portion integral therewith and depending therefrom, the shank portion forming a pair of separate leg members normally biased apart, each of the leg members having at least one inner planar side, the planar side defined by converging planes along the center of the shank, a first corrugated surface defined on at least a portion of the outer surface of the shank and the leg members, a compressible collar having a second corrugated surface along at least a portion of the inner wall thereof and frictionally engaging the shank by cooperating with the first corrugated surface for urging the leg members towards each other, the collar being compressed upward toward the head as the nail is driven and the leg members are biased apart.

DETAILED DISCLOSURE

Referring more particularly to the drawings, there is shown a conventional wall 10 with or without a decorative panel 12 thereon. The instant device includes a nail head portion 14 that is generally disc shaped from which there depends (perpendicularly) a shank portion 16 which is longitudinally split along at least a portion of its length, i.e., ⅓ to ⅔ thereof, and is constructed of spring steel or other suitable rigid, firm resilient material that is prebiased to separate into two equal leg portions 18, 20 having planar walls 22, 24 along the split 26 that are normally maintained in contact and parallel prior to the use of the nail. The distal end of one side of each leg 22, 24 is preferably beveled (chisel pointed) to facilitate entry into the wall 10. The outer wall of the shank 16 for at least a portion thereof, will define corrugated surface 28. The cross section of the shank 16 may be annular, half annular or rectangular. The corrugation 28 will extend from adjacent the head 14 to at least partially along the split line 26. The shank 16 will have a predetermined external diameter that is smaller than the internal diameter of a collar 30 that has a corrugated internal wall adapted to mate and cooperate with the corrugated surface 28 of the shank 16. The collar 30 will frictionally engage the shank 16 and prevent premature opening of the legs 22, 24 which are biased towards and in contact with each other by the same. When the shank 16 is driven into the wall 10, the legs 22, 24 slowly begin to automatically spread apart and the collar 30 is compressed upward upon itself for a sufficient distance to allow tail spread of the legs 22, 24. The collar 30 is constructed of a deformable material that is strong enough when fully expanded to urge and maintain the legs 22, 24 in contact yet compressible and deformable enough to allow the same to collapse when it contacts the wall 10 as the shank is driven therein, i.e., aluminum, plastic, etc. The length of the collar 30 may vary, though it is preferably not as long as the corrugated surface of the shank 16.

Since it is obvious that numerous changes and modifications can be made in the above-described details without departing from the spirit and the nature of the invention, it is to be understood that all such changes and modifications are included within the scope of the invention.

I claim:

1. A self-anchoring nail, comprising a head portion and a spring steel shank portion integral therewith and depending therefrom, said shank portion forming a pair of separate leg members, said leg members having a pair of free ends, said pair of free ends being normally biased apart, each of said leg members having at least one inner planar side extending along the length thereof, said planar side defined by converging planes along the center of said shank, a first corrugated surface defined on at least a portion of the outer surface of said shank and on at least a portion of the outer surface of each of said leg members, a compressible collar having a second corrugated surface along at least a portion of the inner wall thereof and frictionally engaging said shank by cooperating with said first corrugated surface for urging said leg members towards each other disposing said converging planes into substantially parallel alignment when said collar and said shank is disposed in an undriven state, a third corrugated surface defined along at least a portion of the exterior surface of said compressible collar, one end of said collar being located adjacent said head portion, said one end having a flange-like portion extending radially outwardly from said inner wall, said flange-like portion having a lateral annular-like surface thereof extending normal to the longitudinal axis of said shank, said flange-like portion of said collar being disposed located intermediate said head portion and the free ends of said pair of leg members and whereby said second corrugated surface is disposed entirely covering said first corrugated surface when said collar and said shank are in said undriven state, said collar being disposed upwardly towards said head as said nail is driven into a work piece into a driven state whereby said collar is disposed along the length of said shank portion towards said head and uncovers at least a portion of said free ends of said leg members such that said at least a portion of said free ends of said leg members are free to be disposed apart and whereby said flange-like portion is disposed into touching engagement with said work piece and with said head and whereby said second corrugated surface uncovers a portion of said first corrugated surface disposing said third corrugated surface and said portion of said first corrugated surface in side by side co-axially aligned relationship with each other.

2. The nail as defined in claim 1, having an annular cross section.

3. The nail as defined in claim 1, wherein said leg members form approximately ⅓ to ⅔ the length of said shank.

4. The nail as defined in claim 1, wherein at least a portion of the distal ends of said leg members are beveled.

5. The nail as defined in claim 1, wherein the length of said collar is shorter than said leg members.

6. The nail as defined in claim 1, wherein said head has a diameter larger than that of said shank.

7. The nail as defined in claim 1 wherein said annular-like surface extends outwardly from said third corrugated surface.

8. The nail as defined in claim 1, wherein said head is a disc.

9. The nail as defined in claim 8, wherein said annular-like surface is smaller in diameter than said disc.

* * * * *